2162X
Sheet 1 - 2 Sheets.
B. Swift.
Cloth Shearing Mach.
Patented Jul. 1, 1814.
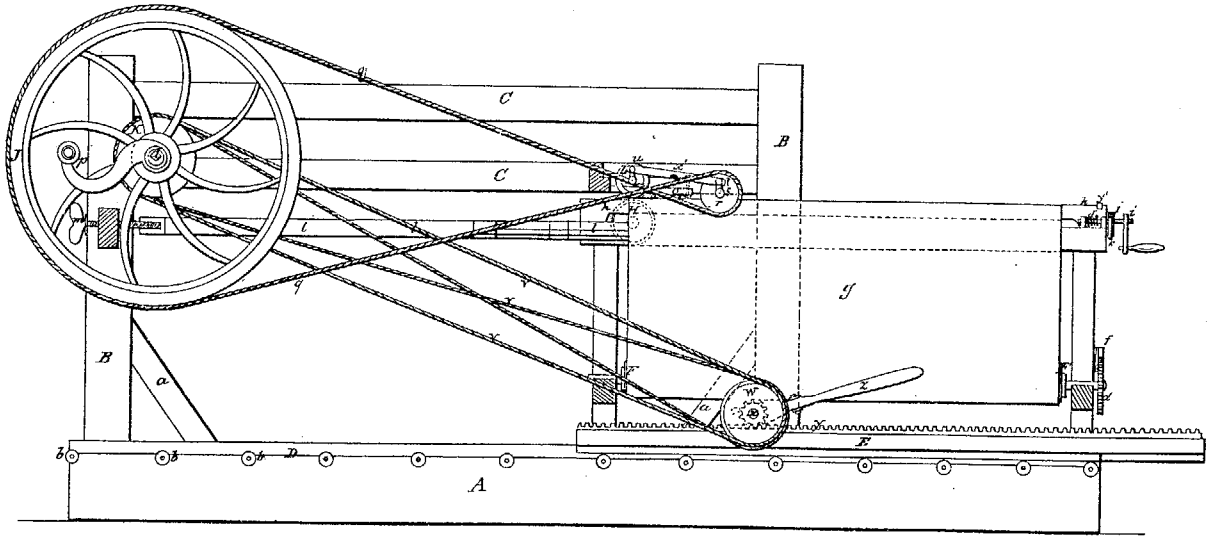
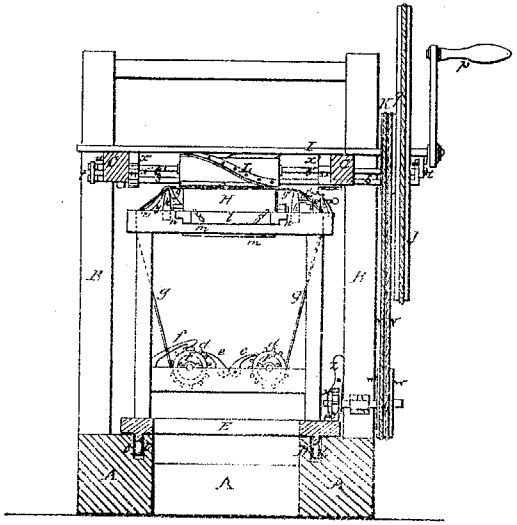
N. PETERS, PHOTO-LITHOGRAPHER, WASHINGTON, D. C.

2162X
Sheet 2. 2 Sheets.
B. Swift.
Cloth Shearing Mach.
Patented Jul. 1, 1814.
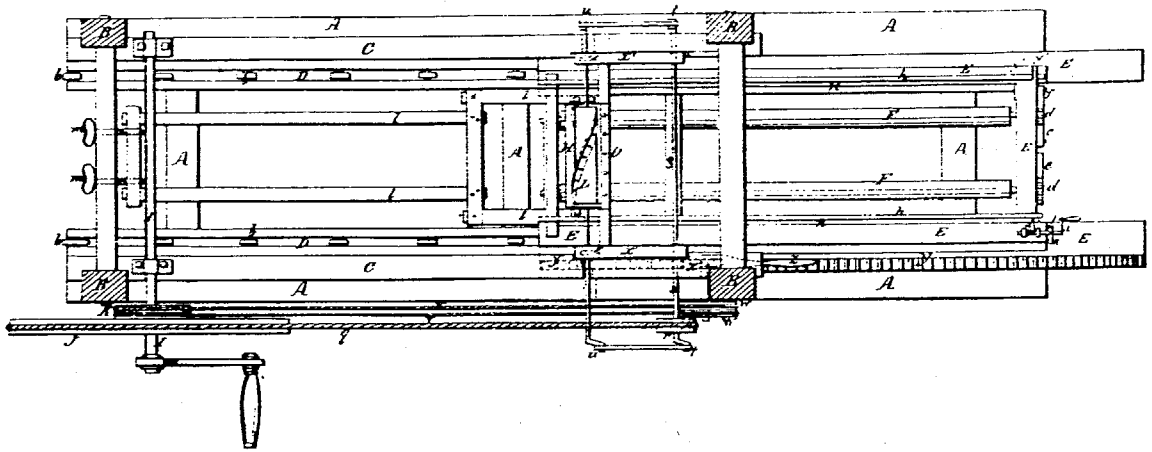

July 1. 1814 2

2162X

Beriah Swift

Letters Patent.

The schedule referred to in these Letters Patent and making
part of the same containing a description in the words of
the said Beriah Swift himself of his Machine for
Shearing Cloths.

This Machine consists of a frame about fourteen feet
in length and about four feet in breadth the bottom piece
which is grooved or rabbetted for the carriage to run in
and on which are four upright pieces with suitable rails
and boxes to support the main shaft and the wheels
connected therewith together with the shears. The carriage
which moves within the said frame on rollers, requires to
be about seven feet in length three feet in height and two
feet six inches in width. ~~to which~~ to which is connected
lengthways two cylinders (each capable of receiving a
whole piece of cloth, with rag wheels, dogs, gudgeons and
hooks, one to roll the cloth in previous to its being sheared
and from which the cloth passes over lengthways across the
top of the carriage where it is strained between two rails
with hooks on the top of the said carriage and is tightened
by means of a windlass which has a rag wheel and dog
fixed at the end of said carriage on brackets which are
fastened two cords connected with one of the stretching rails
the other of the rails are fixed to the carriage behind the
covered cylinder. the cloth then passes over the top of
said carriage after it is sheared to the other cylinder
on which it is rolled. At the far end of this carriage

2162 is a cylinder covered with several thicknesses of cloth hun
on gudgeons at the end of a frame which moves horizon-
tally by means of two screws at the end of the main frame
to adjust the covered cylinder to the shears, and which horiz
frame works in a rabbet and is flush with the top of the
carriage the said covered cylinder is raised one half of its
diameter above the top of the carriage to support the clo
up to the bed shear. The main shaft is put in motion
turning of a crank, to the shaft is fixed a large and a
small vertical wheel the large one is connected by a
strap or cord to a small wheel at the end of a small
shaft which gives motion by means of two unequal cr
connected to the steel spiral shear which said shear h
a vibrating motion over the edge of the bed shear by
means of two unequal cranks and which said shears a
immediately over the covered cylinder and all of which
are fixed or suspended crossways on the carriage, the
small vertical wheel on main shaft is connected with
two other vertical wheels by cords or straps one of whi
is on the axis of the pinion which gives motion to the ca
-riage by means of a rack fixed thereto, and as the fra
is so moved the same operation gives motion to the spi
vibrating shears which thereby performs the operation of
shearing the cloth crossways equal to the hand shears
and a youth fourteen or fifteen years of age can with
the improved machine perform four times the quantity
shearing that a good and experienced workman can turn
out of hands by means of hand shears; a spring lever is
fixed on the side of the main frame over the pinion
to throw it out of gear so that the carriage may be
moved back. The spiral shear and its shaft together
with the bed shear is fixed in a frame or two arms
with shaft hung on gudgeons so that the shears ma be raised up & fix the slide more exactly over the recess & cylinder to the working axis.

Witnesses

Mr. Bridges
Geo. G. Hirsbach

Patrick Swift

Actg Engr.

Drawing made
A.J.B.